US012678835B2

(12) United States Patent
Wu et al.

(10) Patent No.: US 12,678,835 B2
(45) Date of Patent: Jul. 14, 2026

(54) OPTICAL SYSTEM

(71) Applicant: Actutek Corporation, Taoyuan City (TW)

(72) Inventors: Ya-Hsiu Wu, Taoyuan City (TW); Yi-Ho Chen, Taoyuan City (TW); Ying-Jen Wang, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 467 days.

(21) Appl. No.: 18/089,145

(22) Filed: Dec. 27, 2022

(65) Prior Publication Data

US 2023/0204941 A1      Jun. 29, 2023

Related U.S. Application Data

(60) Provisional application No. 63/266,034, filed on Dec. 27, 2021.

(51) Int. Cl.
| | |
|---|---|
| *G02B 26/08* | (2006.01) |
| *G02B 7/08* | (2021.01) |
| *G02B 27/00* | (2006.01) |
| *G02B 27/64* | (2006.01) |
| *G03B 5/00* | (2021.01) |
| *H04N 23/51* | (2023.01) |
| *H04N 23/55* | (2023.01) |
| *H04N 23/68* | (2023.01) |

(52) U.S. Cl.
CPC .............. *G02B 26/08* (2013.01); *G02B 7/08* (2013.01); *G02B 27/0006* (2013.01); *G02B 27/646* (2013.01); *G03B 5/00* (2013.01);

*H04N 23/55* (2023.01); *H04N 23/6812* (2023.01); *H04N 23/687* (2023.01); *G03B 2205/0015* (2013.01); *G03B 2205/0069* (2013.01); *H04N 23/51* (2023.01)

(58) Field of Classification Search
CPC ................ G02B 26/08; G02B 26/0816; G02B 26/0825; G02B 26/0833; G02B 7/08; G02B 27/0006; G02B 27/646; G03B 5/00; G03B 2205/0015; G03B 2205/0069; H04N 23/55; H04N 23/6812; H04N 23/687; B60S 1/60
See application file for complete search history.

(56) References Cited

U.S. PATENT DOCUMENTS

| | | | | |
|---|---|---|---|---|
| 2010/0067554 A1* | 3/2010 | Wysocki | ................ | B82Y 20/00 |
| | | | | 359/200.8 |
| 2020/0209520 A1* | 7/2020 | Fu | ...................... | G02B 26/0816 |
| 2022/0326656 A1* | 10/2022 | Newman | ............ | G02B 27/0172 |
| 2023/0341679 A1* | 10/2023 | Nagasaka | ............ | G02B 26/101 |

* cited by examiner

*Primary Examiner* — Jia X Pan
(74) *Attorney, Agent, or Firm* — MUNCY, GEISSLER, OLDS & LOWE, P.C.

(57) ABSTRACT

An optical system is provided, including a first optical module and a second optical module. The first optical module is used for changing the direction of light emitted from a light source. The second optical module corresponds to the first optical module and is used for changing the direction of the light. The direction of the light exit the first optical module is different from the direction of the light exit the second optical module.

17 Claims, 20 Drawing Sheets

<u>1000</u>

1200

2000

2001

OPTICAL SYSTEM

CROSS REFERENCE TO RELATED APPLICATIONS

This application claims the benefit of U.S. Provisional Application No. 63/266,034, filed on Dec. 27, 2021, the entirety of which is incorporated by reference herein.

BACKGROUND OF THE INVENTION

Field of the Invention

The present disclosure relates to an optical system.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include an optical system to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the optical system and how to increase its durability has become an important issue.

BRIEF SUMMARY OF THE INVENTION

An optical system is provided in some embodiments of the present disclosure, including a first optical module and a second optical module. The first optical module is used for changing the direction of light emitted from a light source. The second optical module corresponds to the first optical module and is used for changing the direction of the light. The direction of the light exit the first optical module is different from the direction of the light exit the second optical module.

In some embodiments, a center of the light source, a center of the first optical module, and a center of the second optical module are in an identical plane.

In some embodiments, the first optical module includes a first optical element rotatable relative to a first axis. The second optical module includes a second optical element rotatable relative to a second axis. The first axis and the second axis are not parallel.

In some embodiments, one of the first axis and the second axis is perpendicular to the plane.

In some embodiments, another one of the first axis and the second axis is parallel to the plane.

In some embodiments, the optical system further includes a third optical module, wherein the light passes through the third optical module. The light passes through the first optical module and the second optical module in sequence, and the first axis is parallel to the plane. The first axis and the second axis are perpendicular. The third optical module is in the plane.

In some embodiments, the optical system further includes a fourth optical module used for changing the direction of the light. The light passes through the third optical module, the fourth optical module, and the first optical module in sequence. The fourth optical module is in the plane.

In some embodiments, the optical system further includes a fourth optical module used for changing the direction of the light. The light passes through the fourth optical module and the first optical module in sequence.

In some embodiments, the light passes through the fourth optical module and the second optical module in sequence.

In some embodiments, the light passes through the first optical module, the fourth optical module, and the second optical module in sequence, and then exits from the optical system.

In some embodiments, the fourth optical module has a split structure for splitting light.

In some embodiments, the light passes to the first optical module through a first path, and exits the first optical module through a second path. An angle between the first path and the second path is not 90 degrees.

In some embodiments, the angle between the first path and the second path is less than 90 degrees.

In some embodiments, the angle between the first path and the second path is greater than 45 degrees.

In some embodiments, the light reaches the second optical module after exiting from the first optical module, and then exits the second optical module along a third path. An angle between the second path and the third path is not 90 degrees.

In some embodiments, the angle between the second path and the third path is less than 135 degrees.

In some embodiments, the angle between the second path and the third path is greater than 90 degrees.

BRIEF DESCRIPTION OF THE DRAWINGS

Aspects of the present disclosure are best understood from the following detailed description when read with the accompanying FIG.s. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
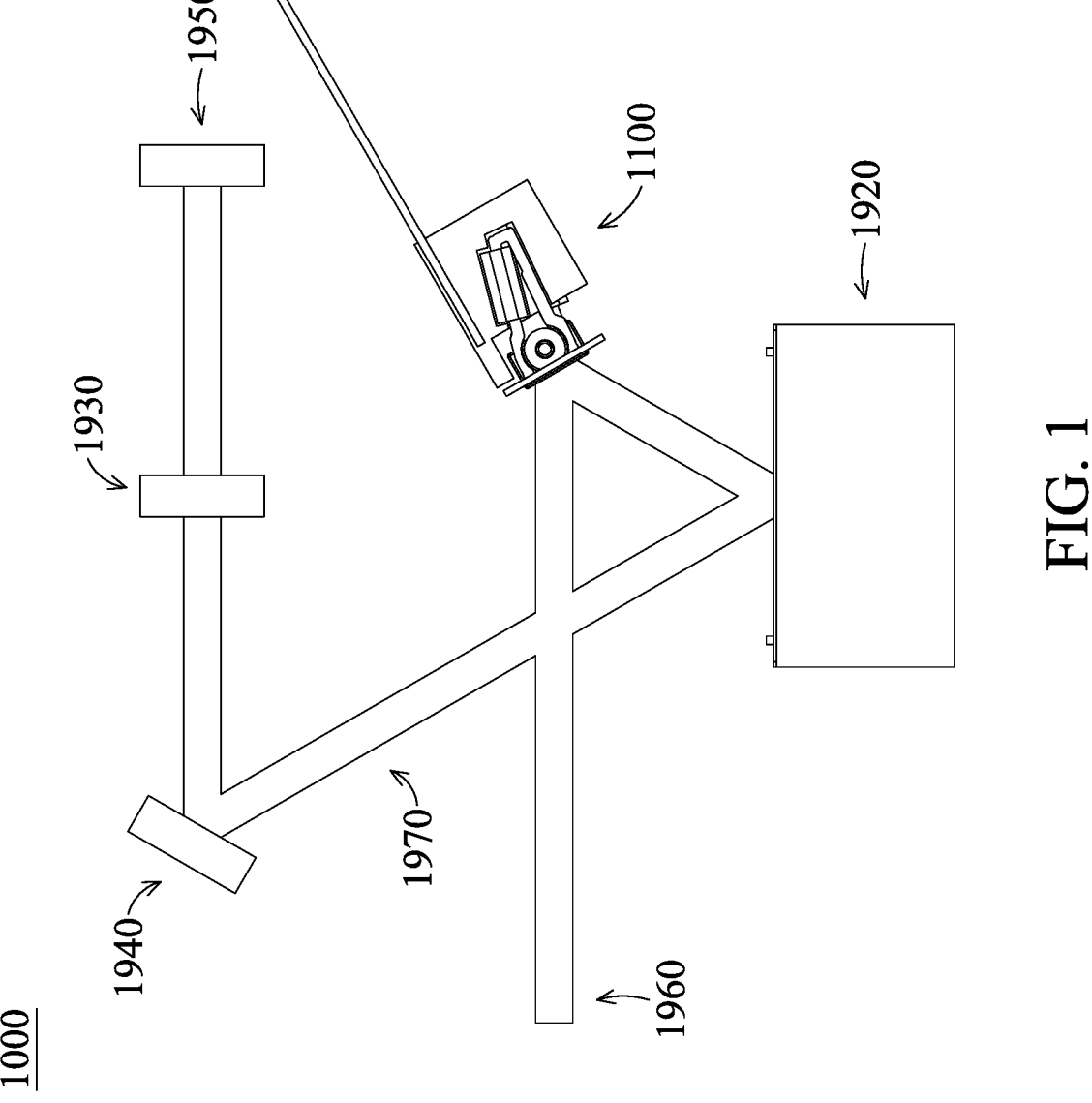
FIG. 1 is a schematic view of an optical system in some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

FIG. 1 is a schematic view of an optical system 1000 according to some embodiments of the present invention. As shown in FIG. 1, the optical system 1000 may include a first optical module 1920, a second optical module 1100, a third optical module 1930, a fourth optical module 1940, and a light source 1950. It should be noted that FIG. 1 only shows the relative positional relationship of the first optical module 1920, the second optical module 1100, the third optical module 1930, the fourth optical module 1940, and the light source 1950, while the optical system 1000 may also have additional connecting elements (not shown) to connect each element, or each element may be directly connected, depending on actual requirements.

As shown in FIG. 1, the light source 1950 may be used to emit light 1970, and the light 1970 may pass through the third optical module 1930, the fourth optical module 1940, first optical module 1920, and the second optical module 1100 in sequence, and then exit the optical system 1000 from a light exit position 1960.

Figure 2:
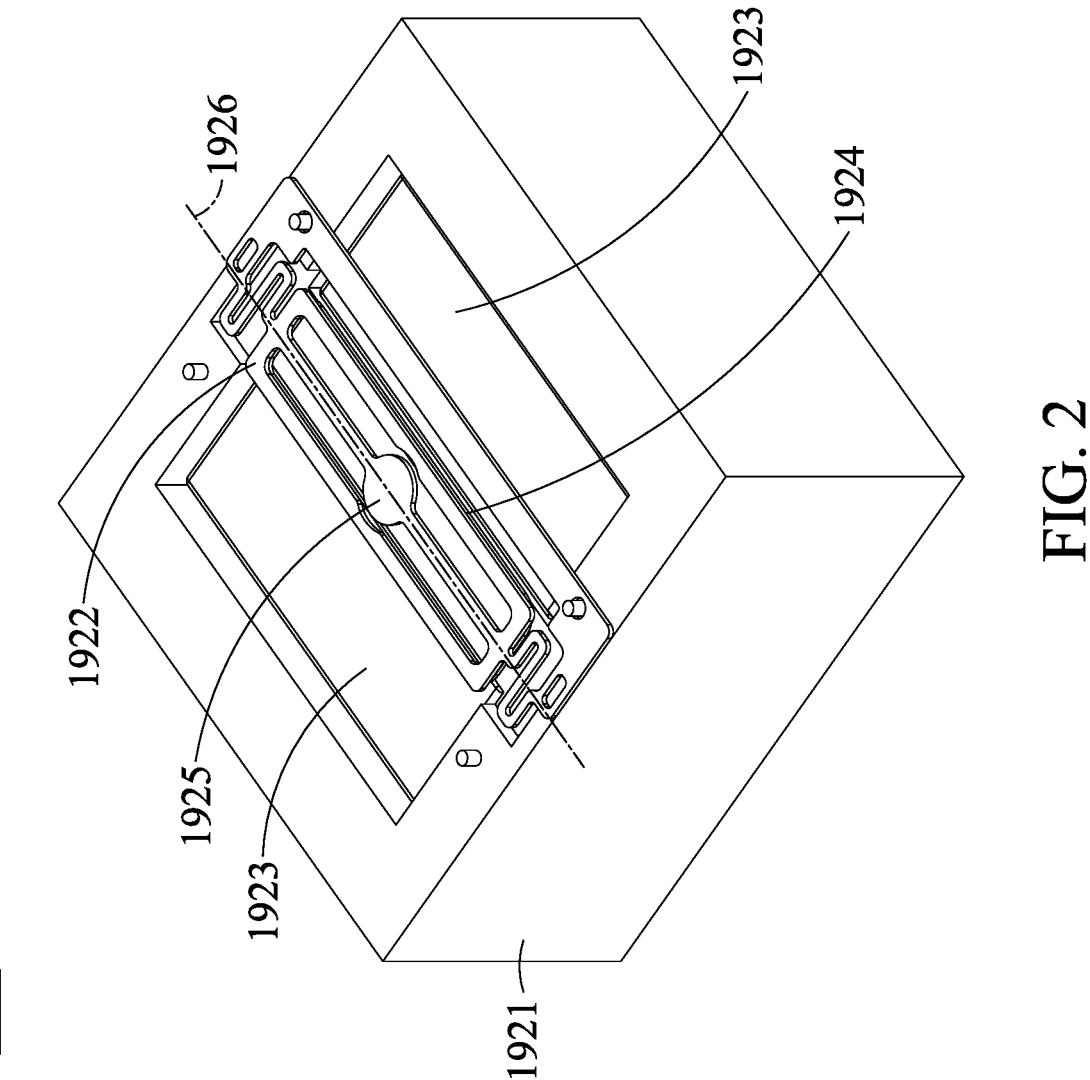
FIG. 2 is a schematic view of the first optical module.

FIG. 2 is a schematic view of the first optical module 1920. As shown in FIG. 2, the first optical module 1920 may include a fixed portion 1921, a resilient assembly 1922, a magnetic element 1923, a coil 1924, and an optical element 1925. In some embodiments, the resilient assembly 1922 may be used to connect the fixed portion 1921, the coil 1924 and the optical element 1925, allowing the coil 1924 and the optical element 1925 to be movably connected to the fixed portion 1921. The magnetic element 1923 may be disposed on the fixed portion 1921, and an electromagnetic driving force may be generated between the magnetic element 1923 and the coil 1924 to drive the optical element 1925 to rotate along a rotational axis 1926.

Figure 3A:
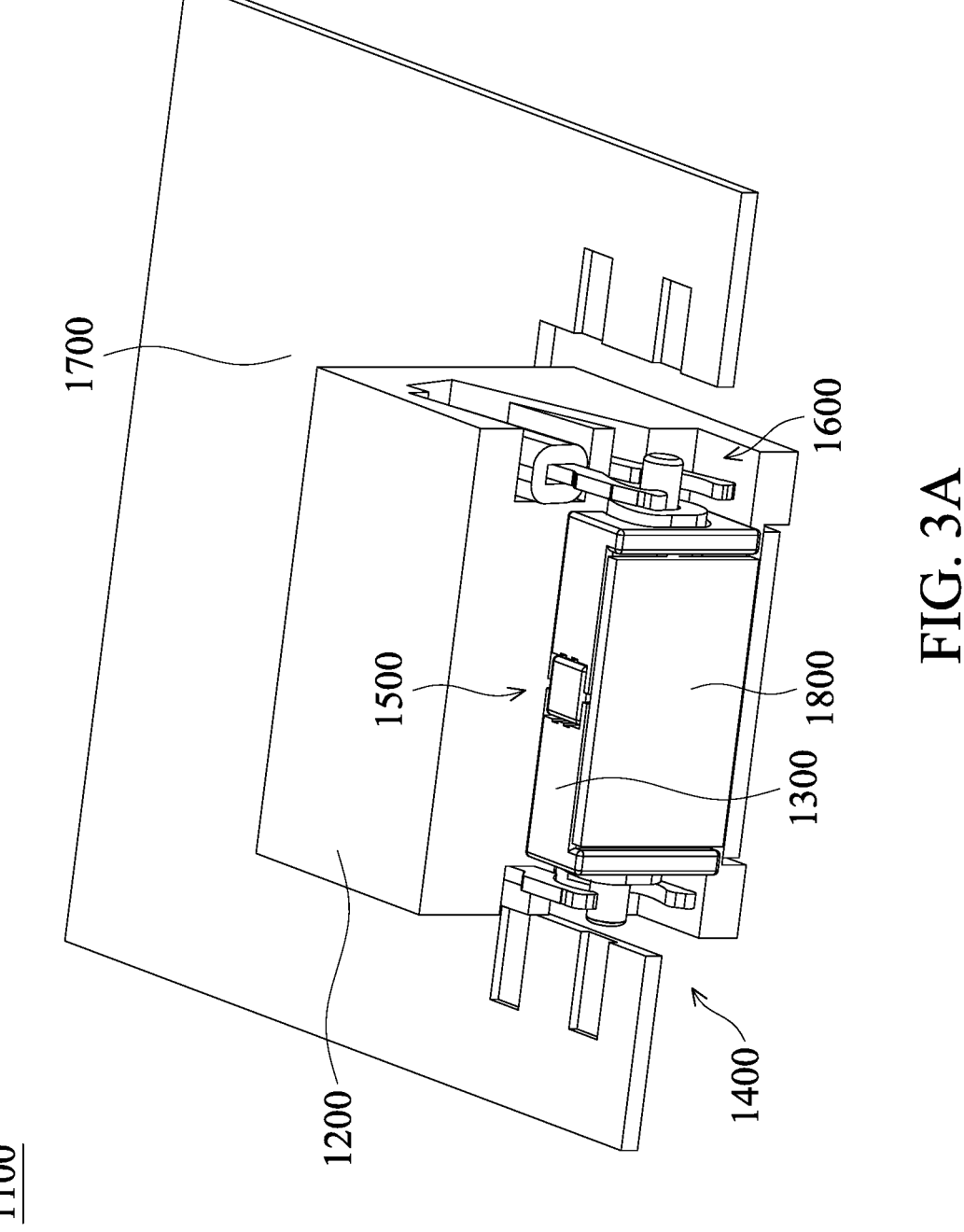
FIG. 3A, FIG. 3B, FIG. 3C, and FIG. 3E are schematic views of an optical element driving mechanism viewed from different directions in some embodiments of the present disclosure.
Figure 3B:
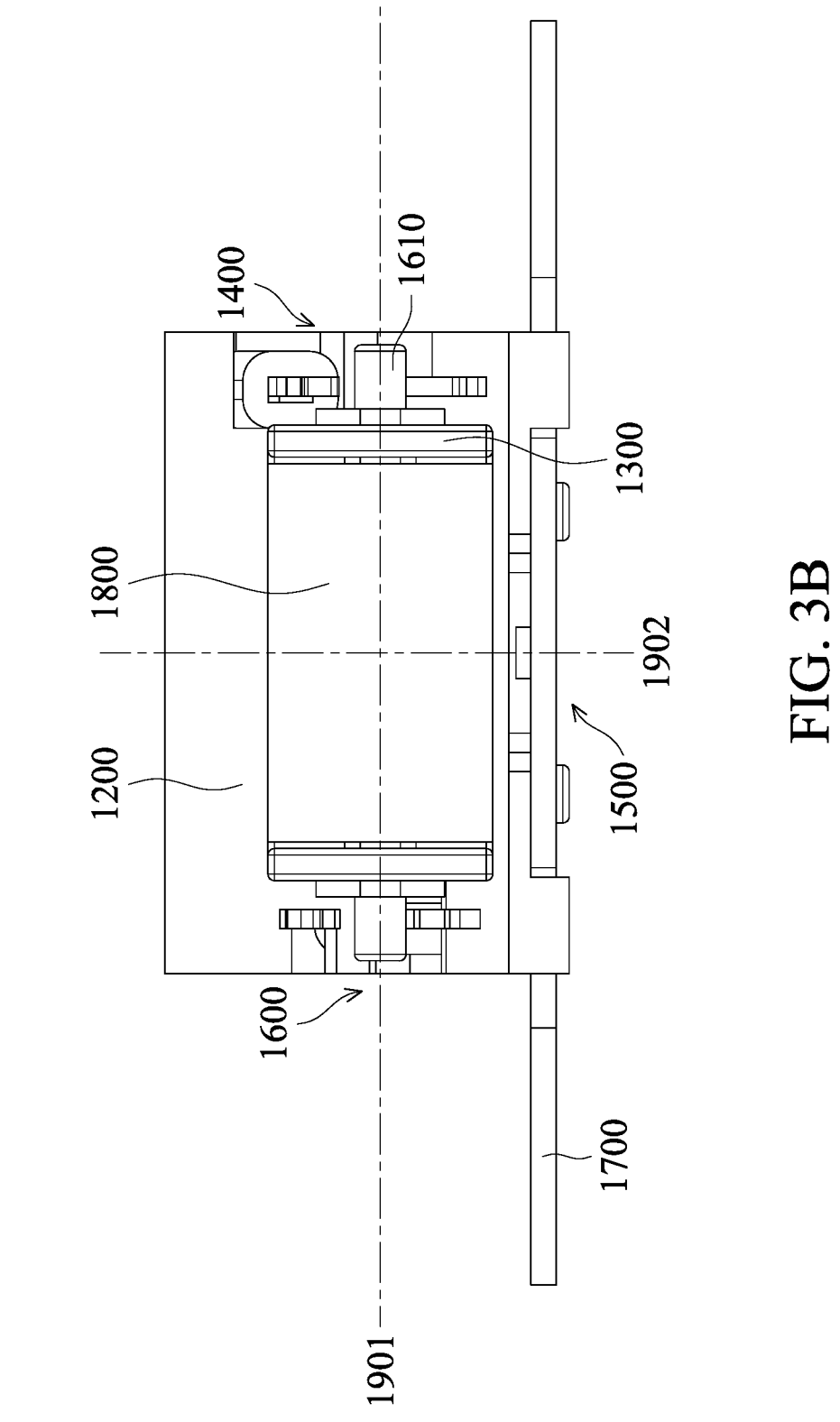
Figure 3C:
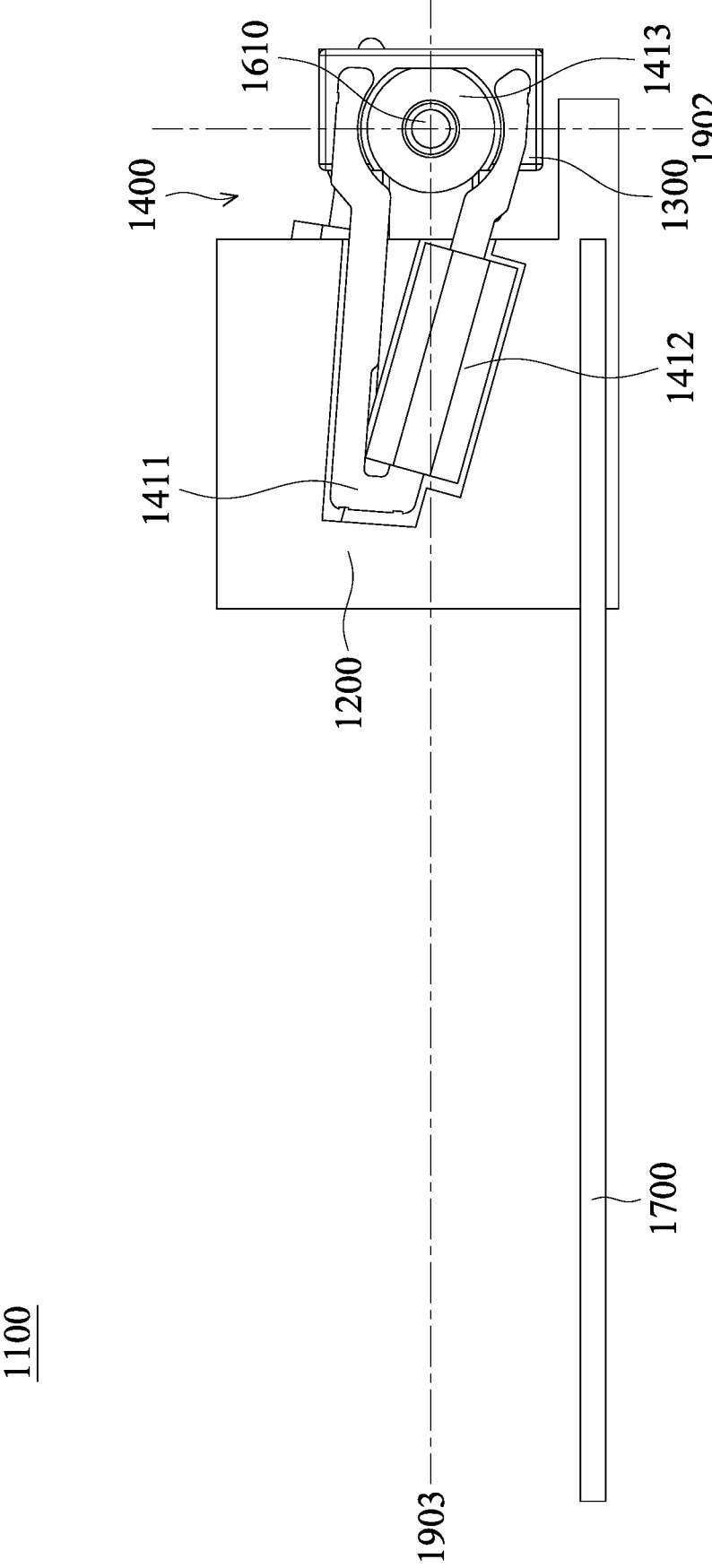
Figure 3D:
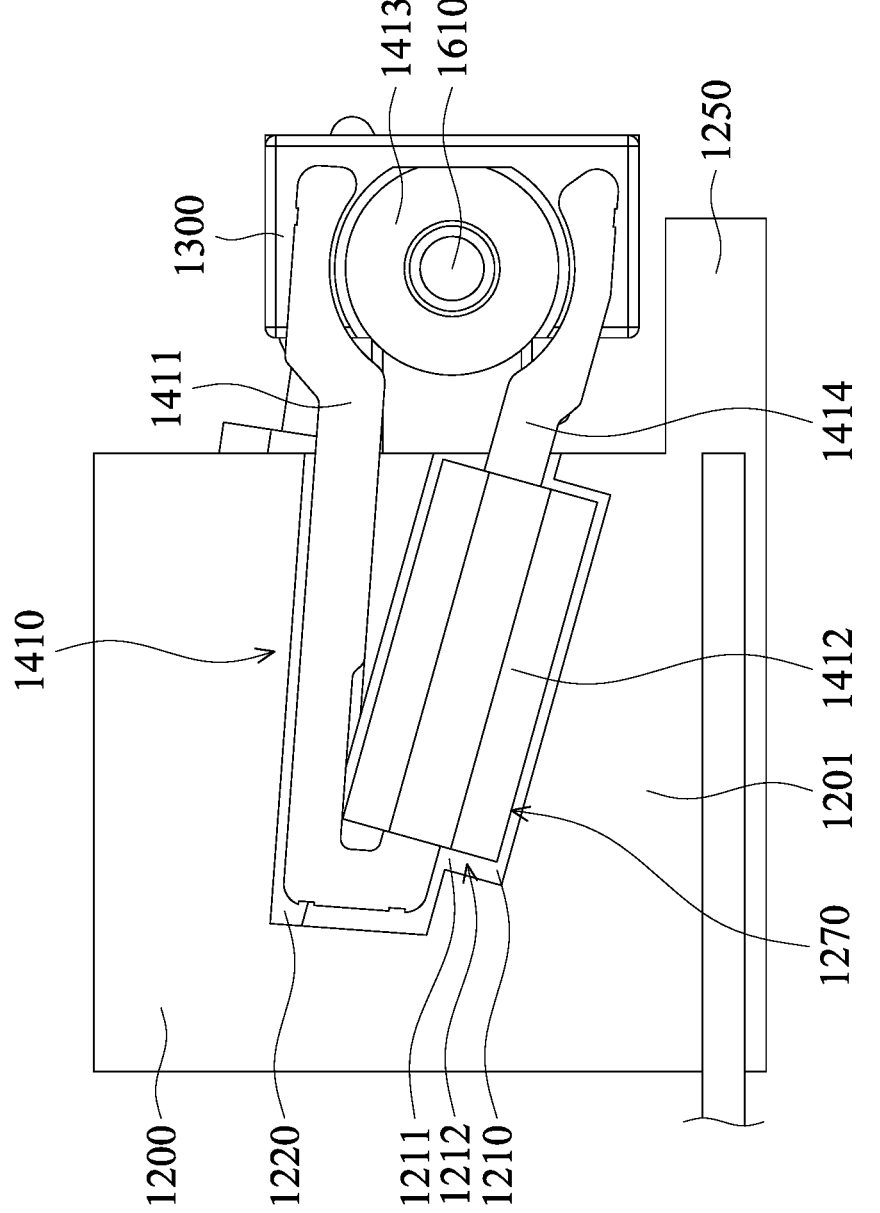
FIG. 3D is an enlarged view of FIG. 3C.
Figure 3E:
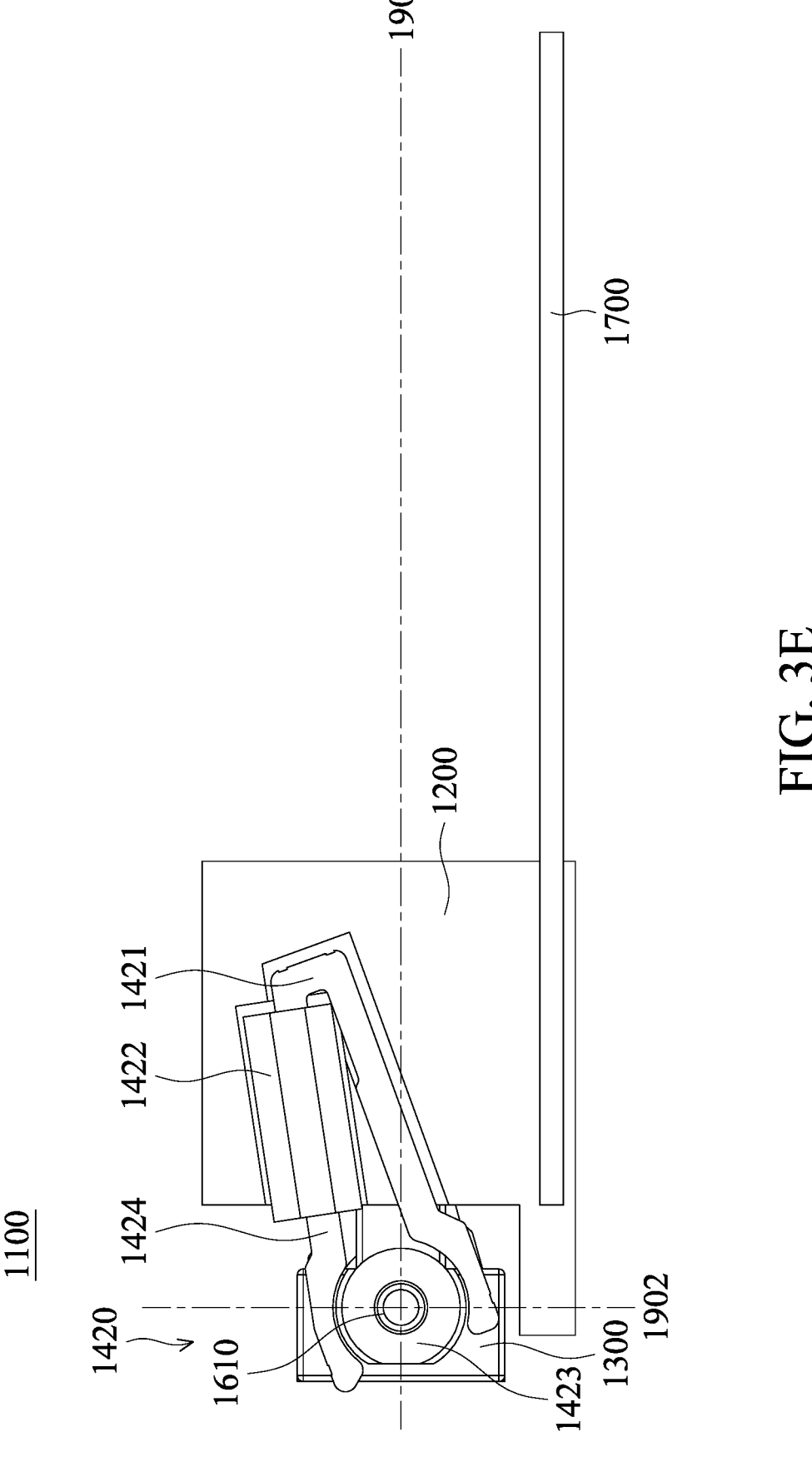

FIG. 3A, FIG. 3B, FIG. 3C, and FIG. 3E are schematic views of an optical system 1000 viewed from different directions in some embodiments of the present disclosure. FIG. 3D is an enlarged view of FIG. 3C.

The optical system 1000 may include a fixed portion 1200, a movable portion 1300, a driving assembly 1400, a sensing assembly 1500, a support assembly 1600, a circuit assembly 1700, and may be used for driving an optical element 1800.

In some embodiments, the optical element 1800 may be, for example, a lens, a mirror, a prism, a reflective polished surface, an optical coating, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure. Therefore, the type and function of the optical element 1800 may be different, and suitable optical element 1800 may be chosen based on actual requirement.

In some embodiments, the optical element 1800 may be disposed on the movable portion 1300, and the movable portion 1300 is movable relative to the fixed portion 1200, so the optical element 1800 is movable relative to the fixed portion 1200 to achieve functions like detection, scanning, or projection.

In some embodiments, the driving assembly 1400 may include, for example, a first driving portion 1410 (including a first magnetic permeable element 1411, a first coil 1412, and a first magnetic element 1413) disposed on one side of the fixed portion 1200 and the movable portion 1300, and a second driving portion 1420 (including a second magnetic permeable element 1421, a second coil 1422, and a second magnetic element 1423) disposed on another side of the fixed portion 1200 and the movable portion 1300. The driving assembly 1400 may be used for driving the optical element 1800 to move relative to the fixed portion 1200 in a first dimension, such as rotation taking an axis parallel to a first axis 1901 as the rotational axis. The first axis 1901 may pass through the intermediate element 1610 and parallel to the intermediate element 1610.

In some embodiments, the first coil 1412 may be disposed on the first magnetic permeable element 1411, and the first magnetic element 1413 may be disposed on the intermediate element 1610 and may correspond to a first magnetic permeable portion 1414 of the first magnetic permeable element 1411. For example, the intermediate element 1610 may pass through the first magnetic element 1413, the rotational axis of the optical element 1800 may pass through the intermediate element 1610, and the first magnetic permeable portion 1414 may be adjacent to the rotational axis. The first magnetic permeable portion 1414 may have an arc-shaped surface surrounding the rotational axis.

In a direction that the first axis 1901 extends, a distance between a center of the first magnetic permeable portion 1414 and a center of the first magnetic element 1413 is greater than 0. Moreover, when viewed along the first axis 1901 or the second axis 1902, the first magnetic element 1413 and the first magnetic permeable portion 1414 do not overlap each other. In the direction that the first axis 1901 extends, the first connecting element 1620 and the first magnetic element 1413 may partially overlap each other to reduce the size in other directions, so miniaturization may be achieved.

In some embodiments, the second coil 1422 may be disposed on the second magnetic permeable element 1421, and the second magnetic element 1423 may be disposed on the intermediate element 1610 and may correspond to a second magnetic permeable portion 1424 of the second magnetic permeable element 1421. For example, the intermediate element 1610 may pass through the second magnetic element 1423, the rotational axis of the optical element 1800 may pass through the intermediate element 1610, and the second magnetic permeable portion 1424 may be adjacent to the rotational axis. The second magnetic permeable portion 1424 may have an arc-shaped surface surrounding the rotational axis.

In a direction that the first axis 1901 extends, a distance between a center of the second magnetic permeable portion 1424 and a center of the second magnetic element 1423 is greater than 0. Moreover, the second axis 1902 may be perpendicular to the first axis 1901 and the plate-shaped circuit assembly 1700. When viewed along the first axis 1901 or the second axis 1902, the second magnetic element 1423 and the second magnetic permeable portion 1424 do not overlap each other. In the direction that the first axis 1901 extends, the first connecting element 1620 and the second magnetic element 1423 may partially overlap each other to reduce the size in other directions, so miniaturization may be achieved.

In some embodiments, when viewed in the first direction, the first connecting element 1620 and the second connecting element 1630 may be between the first magnetic element 1413 and the second magnetic element 1423, and the third opening 1310 does not overlap the first magnetic element 1413 and the second magnetic element 1423.

In some embodiments, in the direction that the first axis 1901 extends, the centers of the first magnetic permeable element 1411 and the second magnetic permeable element 1421 do not overlap each other, or the entire first magnetic permeable element 1411 and the entire second magnetic permeable element 1421 do not overlap each other. Moreover, the winding axis of the first magnetic permeable element 1411 and the winding axis of the first coil 1412 are not parallel, and the winding axes are not parallel and perpendicular to the second axis 1902.

Figure 4A:
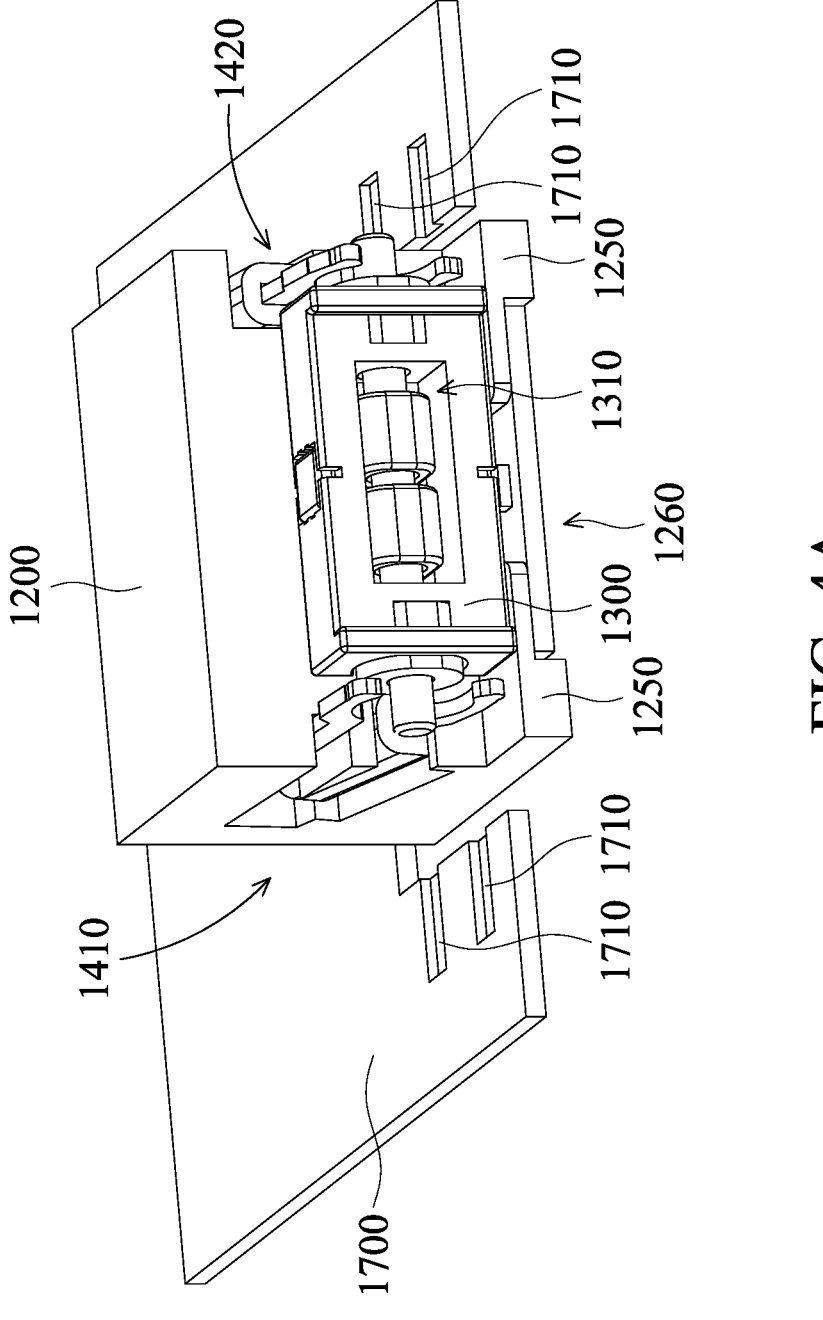
FIG. 4A and FIG. 4B are schematic views of the optical element driving mechanism, wherein the optical element is omitted.
Figure 4B:
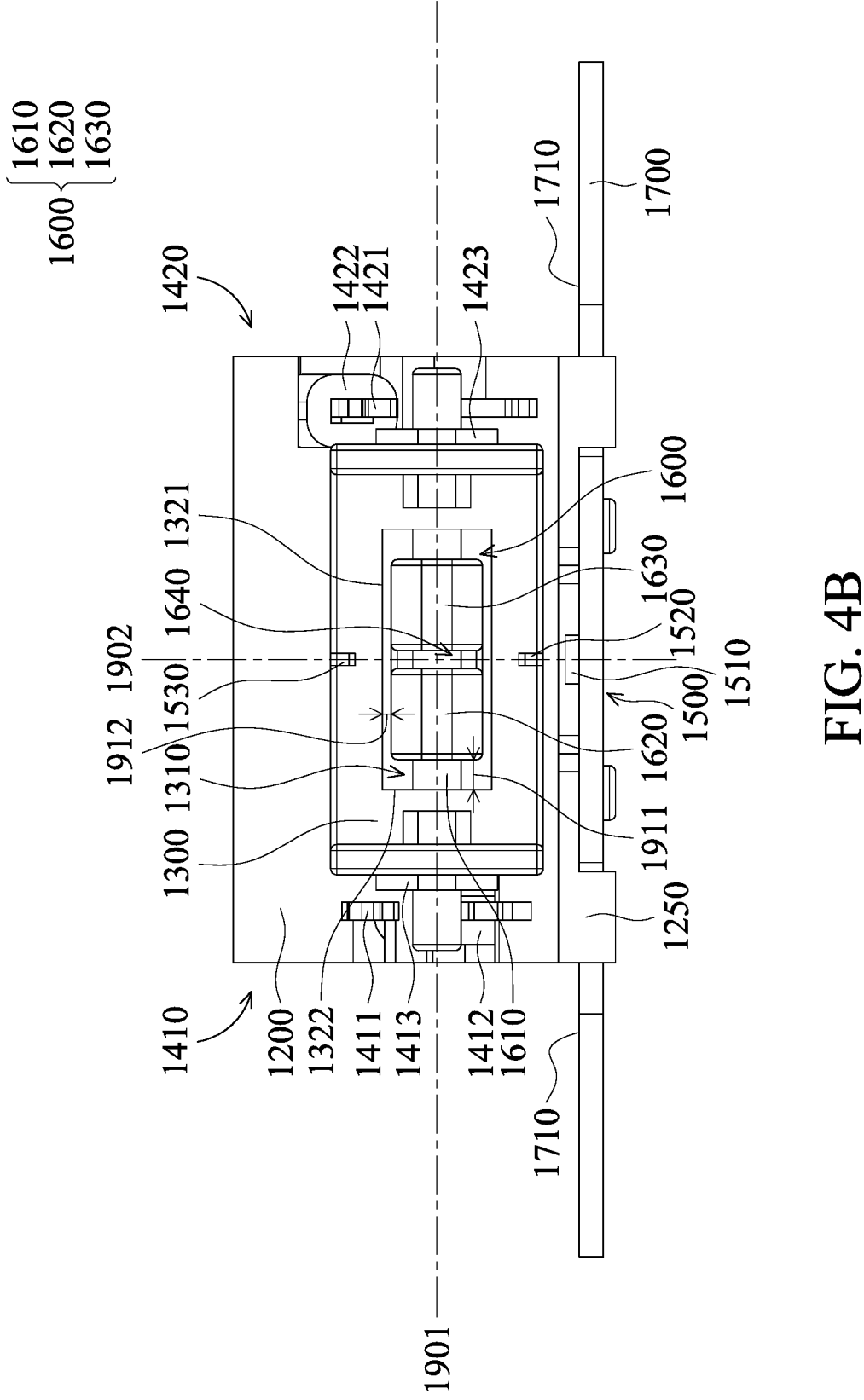

FIG. 4A and FIG. 4B are schematic views of the optical system 1000, wherein the optical element 1800 is omitted.

Figure 4C:
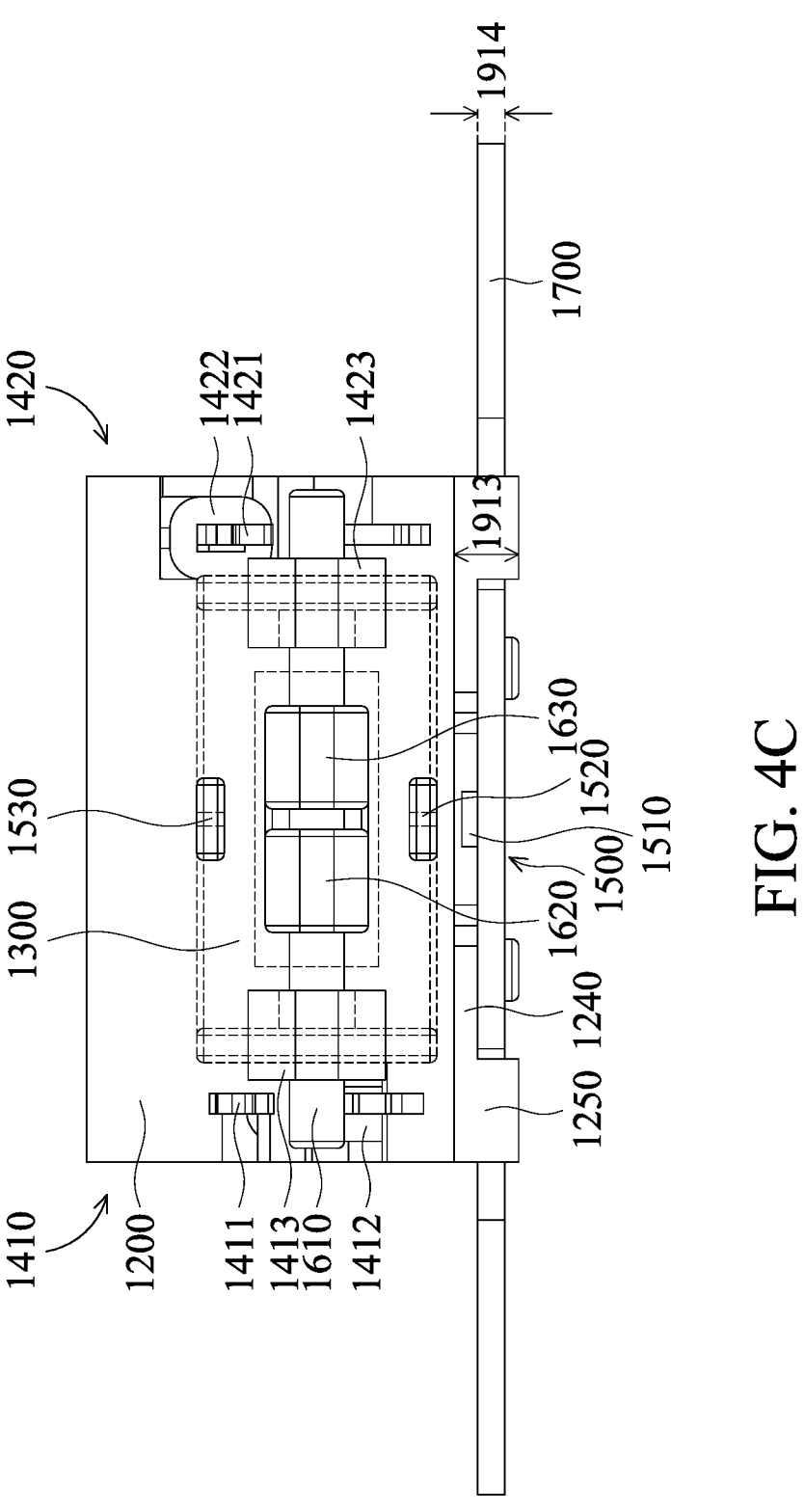
FIG. 4C and FIG. 4D are schematic views of some elements of the optical element driving mechanism.
Figure 4D:
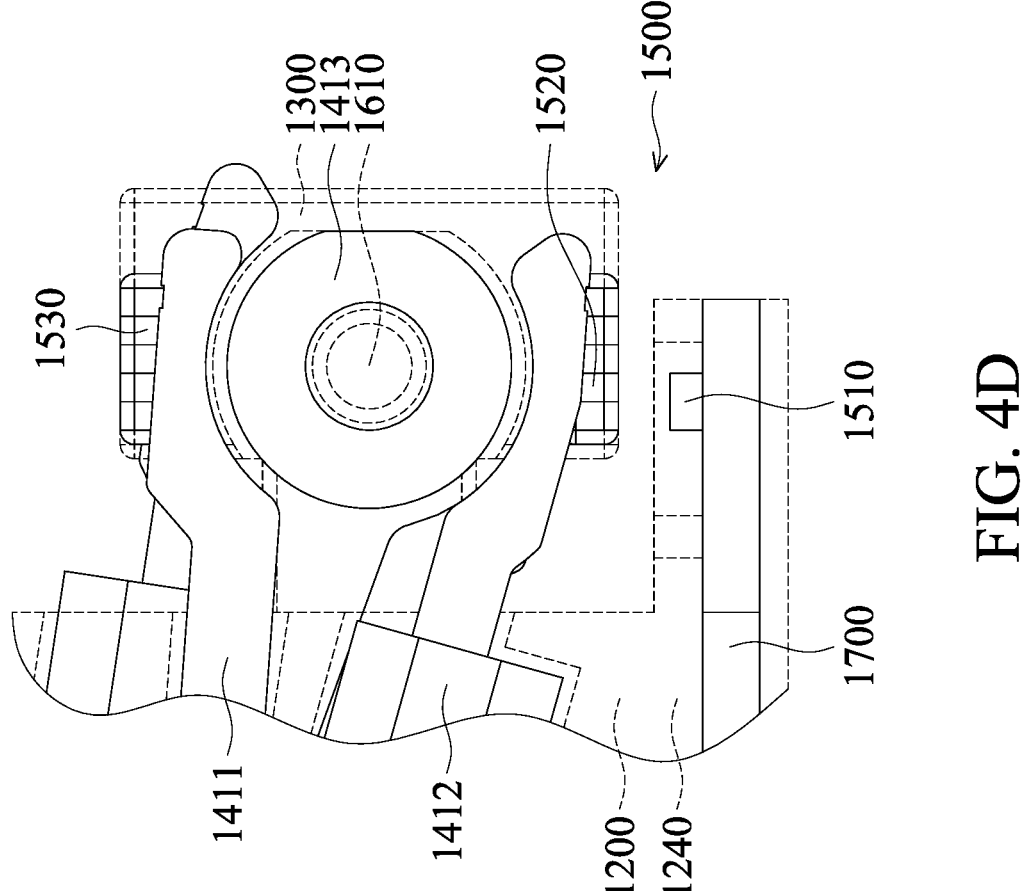

FIG. 4C and FIG. 4D are schematic views of some elements of the optical system 1000, wherein the elements behind the movable portion 1300 are further shown.

In some embodiments, the sensing assembly 1500 may be used for detecting the movement of the optical element 1800 relative to the fixed portion 1200, and may include a sensing element 1510, a second reference element 1520, and a balance element 1530. In some embodiments, the sensing element 1510 may correspond to the second reference element 1520, such as overlap each other in the Z direction, and the sensing element 1510 and the second reference element 1520 may be respectively disposed on the fixed portion 1200 and the movable portion 1300, or their positions may be interchanged, depending on design requirement.

In some embodiments, the sensing element 1510 may include a Hall sensor, a magnetoresistance effect sensor (MR sensor), a giant magnetoresistance effect sensor (GMR sensor), a tunneling magnetoresistance effect sensor (TMR sensor), or a fluxgate sensor. Therefore, the sensing element 1510 may detect the magnetic field variation of the second reference element 1520 to get the position of the movable portion 1300 relative to the fixed portion 1200 when the movable portion 1300 moving relative to the fixed portion 1200.

In some embodiments, the balance element 1530 may include magnet, and the second reference element 1520 and the balance element 1530 may be disposed on opposite sides of the movable portion 1300 to balance the weight on different sides of the movable portion 1300. In some embodiments, the first connecting element 1620 may be between the second reference element 1520 and the balance element 1530. In a direction that the second axis 1902 extends, the second reference element 1520 and the balance element 1530 at least partially overlap each other. In some embodiments, the first coil 1412 and the first magnetic element 1413 may arrange in a direction (e.g., a direction that the first axis 1901 extends) different from a direction that the second reference element 1520 and the sensing element 1510 arranged (e.g., the direction that the second axis 1902 extends).

Figure 5A:
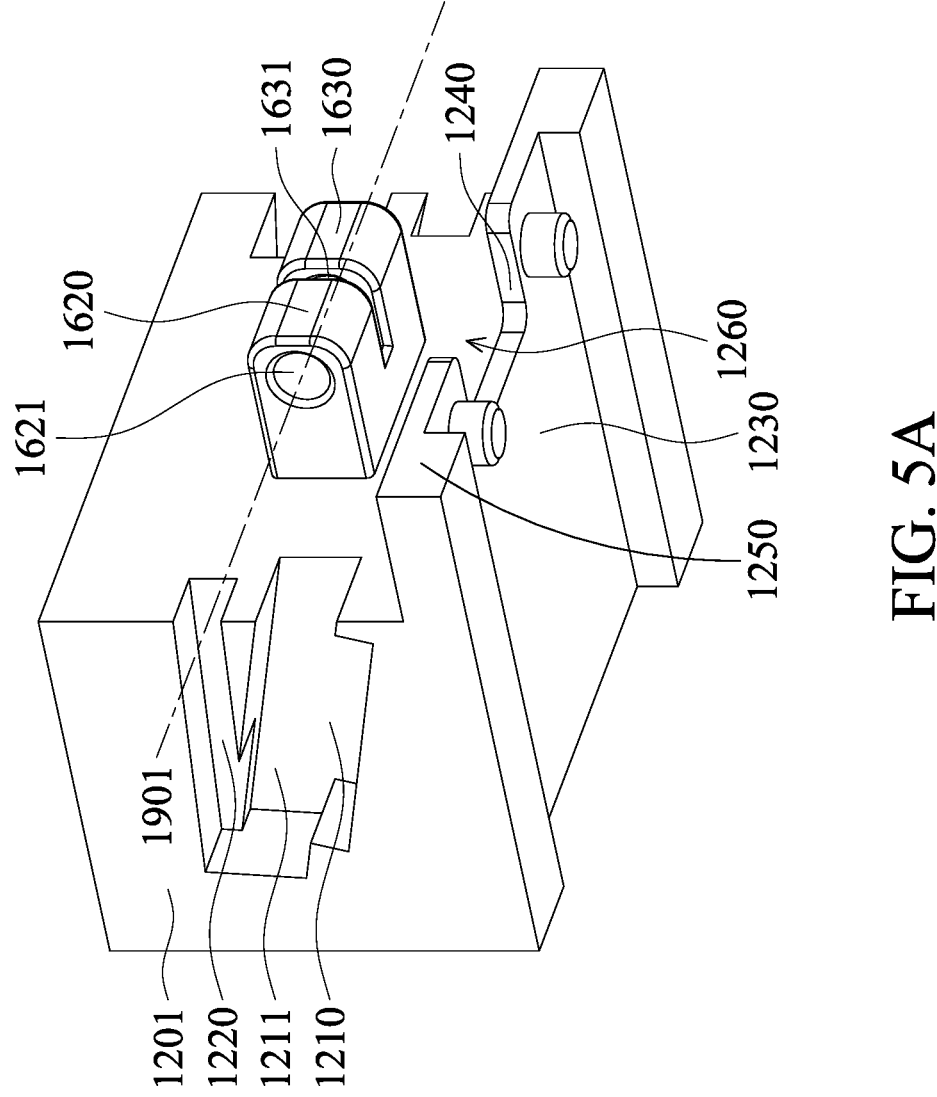
FIG. 5A and FIG. 5B are schematic views of the fixed portion.
Figure 5B:
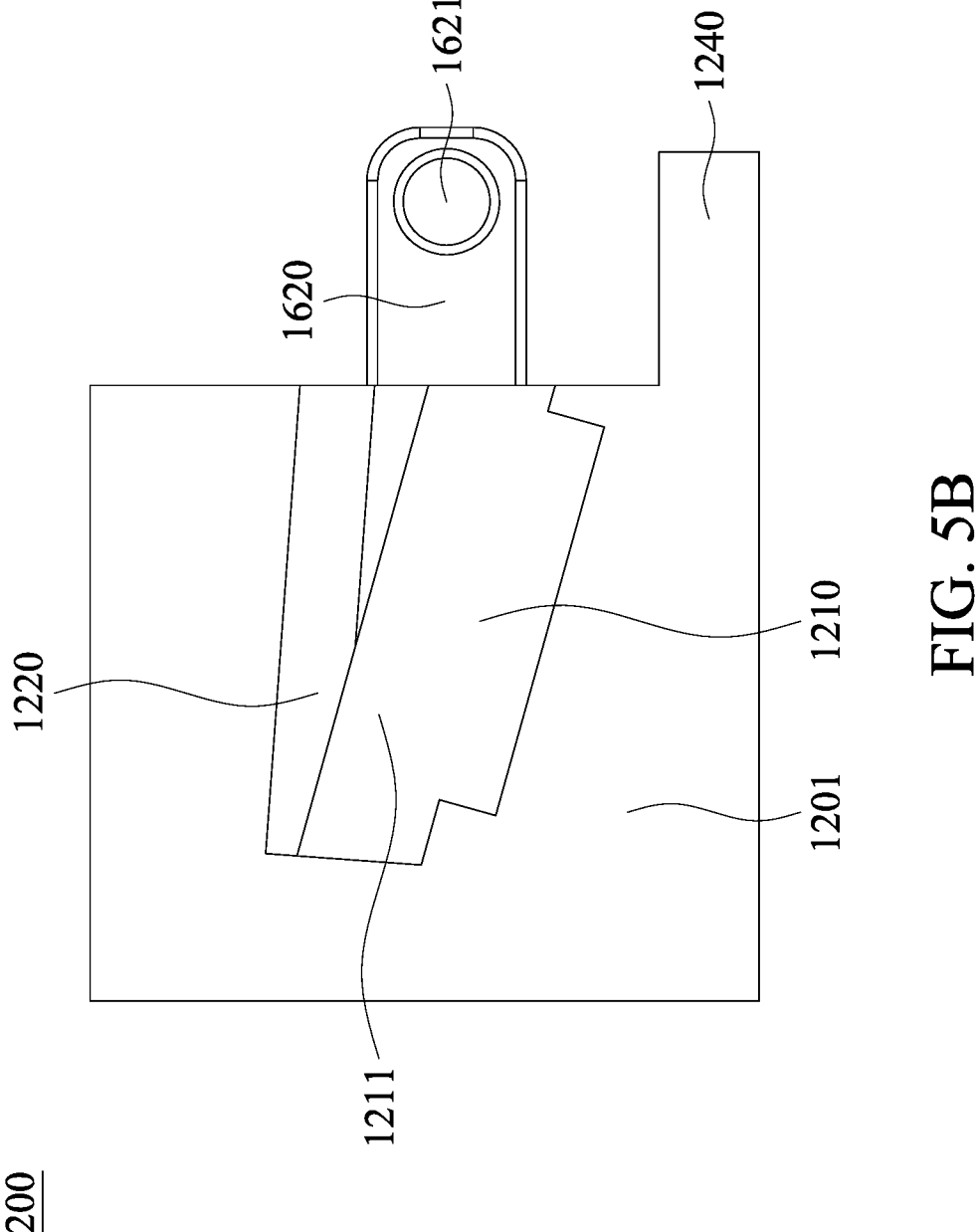

In some embodiments, the support assembly 1600 may include an intermediate element 1610, a first connecting element 1620, and a second connecting element 1630. FIG. 5A and FIG. 5B are schematic views of the fixed portion 1200. The optical element 1800 is movable relative to the fixed portion 1200 through the support assembly 1600. The intermediate element 1610 may be strip-shaped and may extend along the first axis 1901. The first connecting element 1620 and the second connecting element 1630 may be disposed on the fixed portion 1200, and may have a first opening 1621 and a second opening 1631, respectively. The first opening 1621 and the second opening 1631 are used for accommodating at least a portion of the intermediate element 1610. In some embodiments, the first opening 1621 and the second opening 1631 may have closed structures, which means they may be O-shaped instead of U-shaped, so the position of the intermediate element 1610 may be defined.

In some embodiments, when viewed in a first direction that is perpendicular to the first axis 1901 and the second axis 1902, such as shown in FIG. 4B, the first connecting element 1620 is closer to the center of the optical element 1800 than the driving assembly 1400, the first direction is perpendicular to the first axis 1901 and the second axis 1902, and the third axis 1903 may be parallel to the first direction. In some embodiments, a first gap 1640 may be between the first connecting element 1620 and the second connecting element 1630, and the center of the optical element 1800 may overlap the first gap 1640 when viewed in the first direction. In some embodiments, the third opening 1310 of the movable portion 1300 may correspond to the first connecting element 1620 and the second connecting element 1630, such as the first connecting element 1620 and the second connecting element 1630 may be disposed in the third opening 1310. When viewed in the first direction, at least a portion of the first connecting element 1620 and the second connecting element 1630 may expose from the third opening 1310.

In some embodiments, the movable portion 1300 may include a first movable portion surface 1321 and a second movable portion surface 1322 facing the first connecting element 1620 and the second connecting element 1630. The first movable portion surface 1321 may be perpendicular to the second axis 1902, and the second movable portion surface 1322 may be perpendicular to the first axis 1901. In other words, the first movable portion surface 1321 and the second movable portion surface 1322 may be not parallel to each other, such as may be perpendicular.

In some embodiments, a distance 1912 between the first movable portion surface 1321 and the first connecting element 1620 may be different from a distance 1911 between the second movable portion surface 1322 and the first connecting element 1620. For example, the distance 1912 may be less than the distance 1911. Moreover, the first gap 1640 may be less than the distance 1911 and may be greater than the distance 1912.

In some embodiments, as shown in FIG. 5A, the fixed portion 1200 may further include a first fixed portion surface 1201, a first accommodating portion 1210, and a second accommodating portion 1220. The first accommodating portion 1210 may be used for accommodating the first coil 1412, and the second accommodating portion 1220 may be used for accommodating the first magnetic permeable element 1411 to protect the first magnetic permeable element 1411 and the first coil 1412. The first accommodating portion 1210 and the second accommodating portion 1220 may be formed on the first fixed portion surface 1201, and the depth of the second accommodating portion 1220 may be less than the depth of the first accommodating portion 1210 to allow the first coil 1412 being accommodated in the deeper first accommodating portion 1210. In some embodiments, the first accommodating portion 1210 may include a first accommodating portion surface 1211 facing the first coil 1412, and the first accommodating portion surface 1211 may be perpendicular to the first axis 1901.

In some embodiments, a second gap 1212 may be between the first accommodating portion 1210 and the first coil 1412, and a first adhesive element 1270 (e.g., glue) may be disposed in the second gap 1212 to allow the first coil 1412 affix on the fixed portion 1200. In some embodiments, the first adhesive element 1270 may be in direct contact with the first accommodating portion surface 1211 and at least partially in the second gap 1212.

In some embodiments, the circuit assembly 1700 may be disposed on the fixed portion 1200 and may be electrically connected to the driving assembly 1400 and the sensing assembly 1500, such as may be electrically connected to the first coil 1412 and the second coil 1422 to provide signal to the driving assembly 1400 and receive the signal detected by the sensing assembly 1500 to control the driving assembly 1400 by this signal.

In some embodiments, the fixed portion 1200 may further include a bottom surface 1230, a bottom plate 1240, a first block wall 1250, and a fourth opening 1260. The bottom surface 1230 faces the circuit assembly 1700 (e.g., perpendicular to the second axis 1902) and is on the bottom plate 1240. The first block wall 1250 may protrude from the bottom surface 1230. In some embodiments, the fourth opening 1260 may form on the bottom plate 1240, correspond to the sensing assembly 1500, and accommodate a portion of the circuit assembly 1700. When viewed along the first axis 1901, as shown in FIG. 4D, the bottom plate 1240 and the sensing assembly 1500 may at least partially overlap each other, such as the bottom plate 1240 may overlap the sensing element 1510. Moreover, as shown in FIG. 4C, a height 1913 of the first block wall 1250 may be greater than a thickness 1914 of the circuit assembly 1700 that is plate-shaped, so the circuit assembly 1700 may be protected.

In some embodiments, as shown in FIG. 4A, a first electrical connecting portion 1710 may be formed on the circuit assembly 1700, and the first block wall 1250 may be between the first electrical connecting portion 1710 and the driving assembly 1400 when viewed along the first axis 1901. The first coil 1412 and the second coil 1422 may electrically connect to the circuit assembly 1700 through the first electrical connecting portion 1710 to provide control signal to the first coil 1412 and the second coil 1422.

Figure 6A:
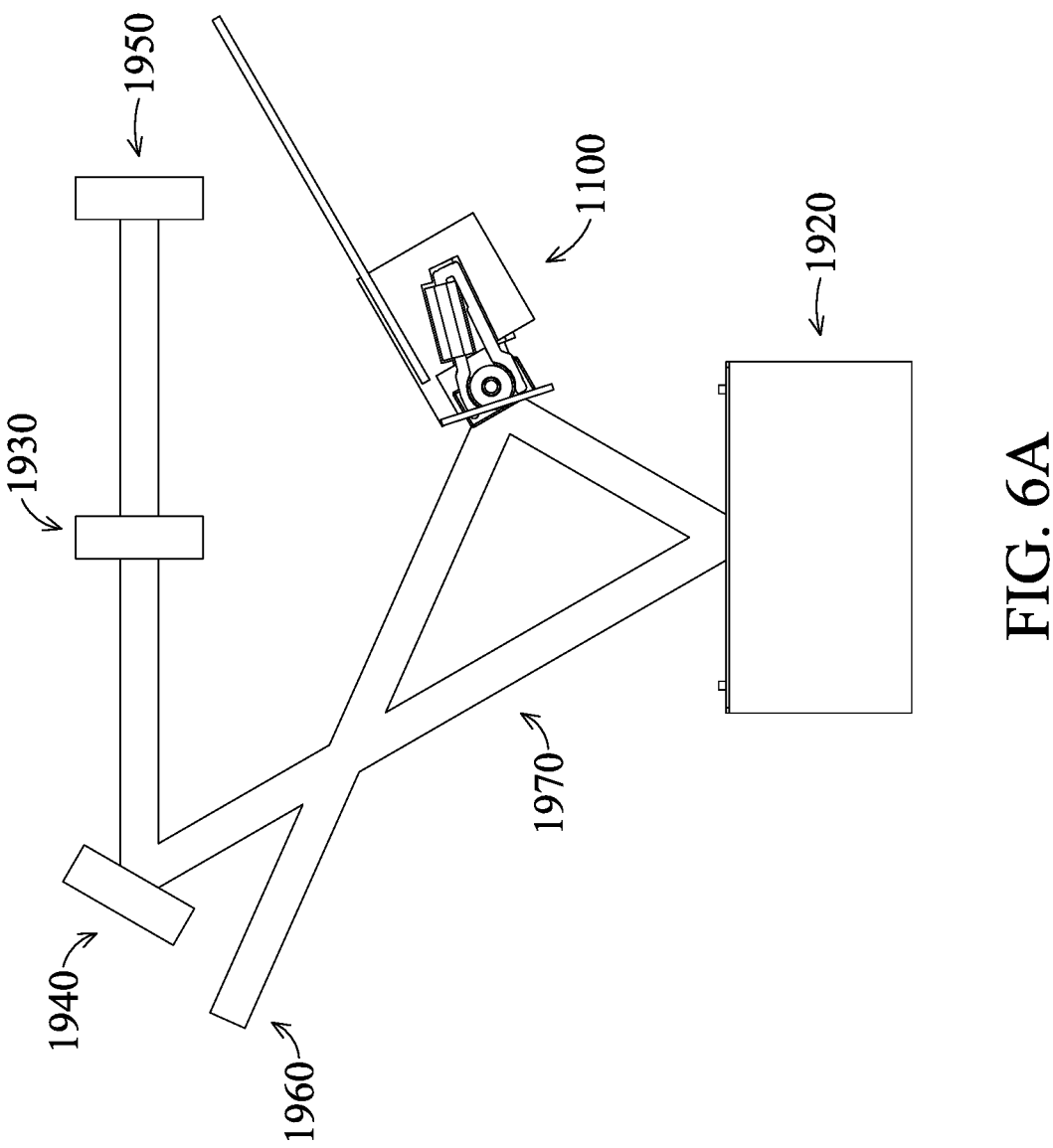
FIG. 6A and FIG. 6B are schematic views when the optical system is in operation.
Figure 6B:
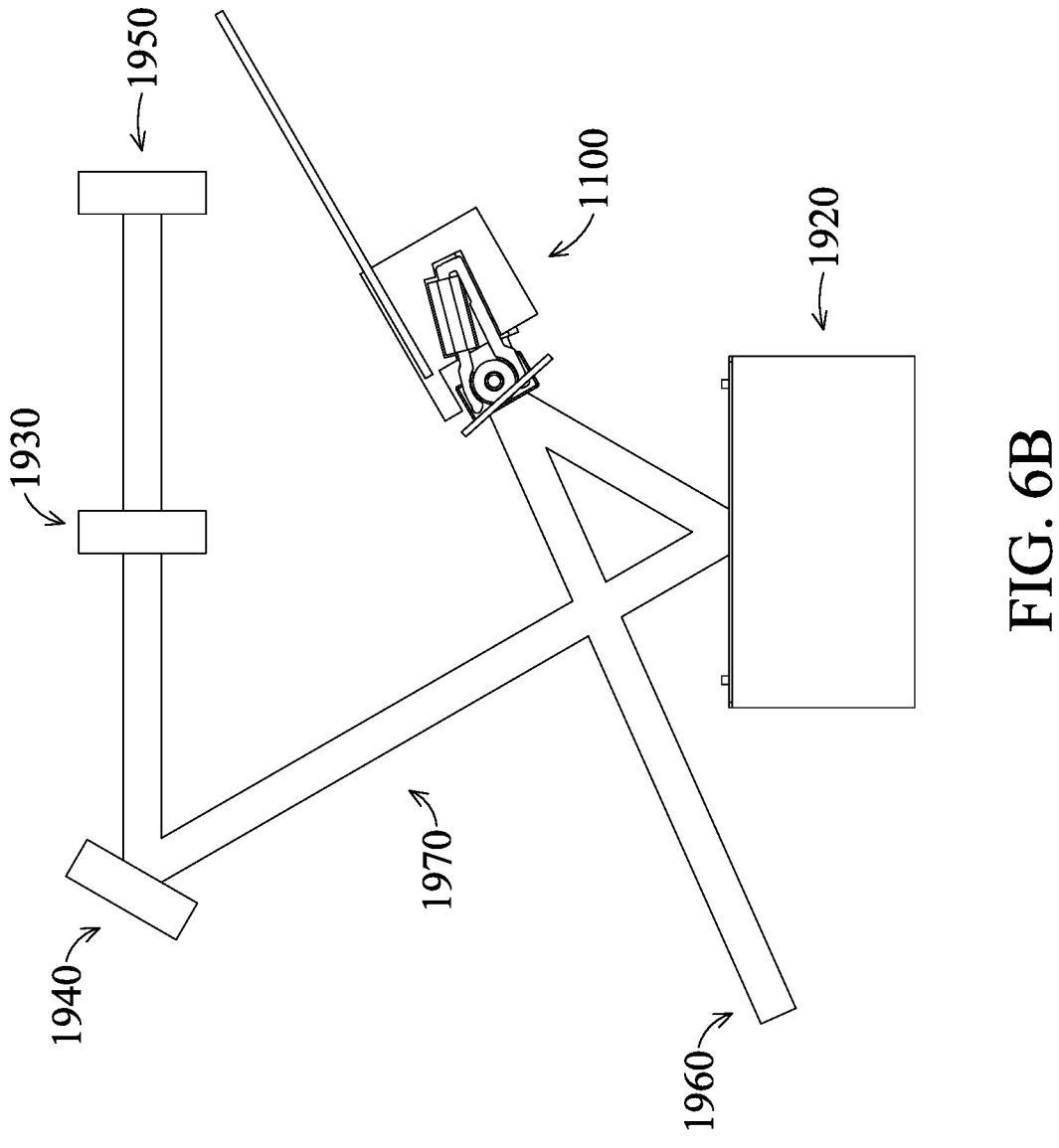

FIG. 6A and FIG. 6B are schematic views of the optical system 1000 in operation. As shown in FIG. 6A and FIG. 6B, when the optical element 1800 of the second optical module 1100 rotates along the first axis 1901, the path of the light 1970 may be changed, such as a point light may be converted into a linear light, or a linear light may be converted into an planar light.

In addition, if the first optical module 1920 also drives the optical element 1925 to rotate along the rotational axis 1926, a similar function may also be achieved. Therefore, when the light source 1950 is a point light, after the light 1970 passes through the first optical module 1920 and the second optical module 1100, the light source 1950 may be transformed into a planar light to achieve functions such as detection, scanning, and projection.

In some embodiments, the first axis 1901 and the rotational axis 1926 may not be parallel to each other, such as may be perpendicular to each other. In some embodiments, the center of the light source 1950, the center of the first optical module 1920, and the center of the second optical module 1100 may be located on a same plane, the first axis 1901 may be perpendicular to this plane, and the rotational axis 1926 may be parallel to this plane. In some embodiments, the positions of the optical modules may also be adjusted so that the first axis 1901 may be parallel to the plane and the rotational axis 1926 may be perpendicular to the plane, depending on design requirements.

In some embodiments, the third optical module 1930 may be used to adjust the light 1970, such as adjusting its wavelength, focal length, beam size and other properties. For example, the third optical module 1930 may include elements such as lenses and filter elements.

In some embodiments, the fourth optical module 1940 may include, for example, reflectors, mirrors, reflective polished surfaces, optical coatings and other elements, which may be used to change the direction of light 1970, In other words, the light 1970 incident to the fourth optical module 1940 is different from light exit from the fourth optical module 1940. Therefore, the light source 1950 may be disposed at a specific position, such as the light exit position 1960 and the light source 1950 may be separated, so as to adjust the overall mechanism and prevent the emission of light from interfering with each other.

Figure 7A:
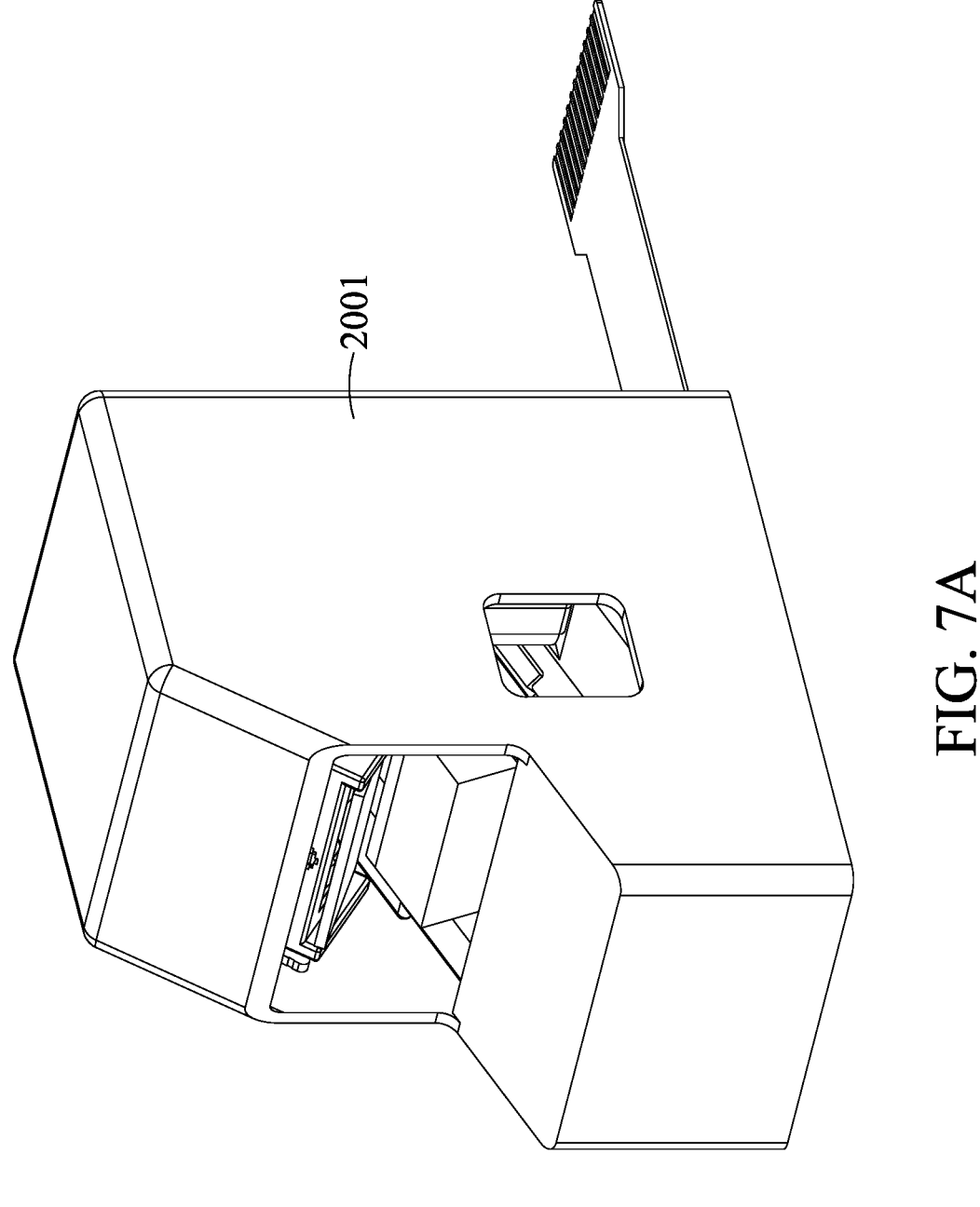
FIG. 7A is a schematic view of an optical system in some embodiments of the present disclosure.
Figure 7B:
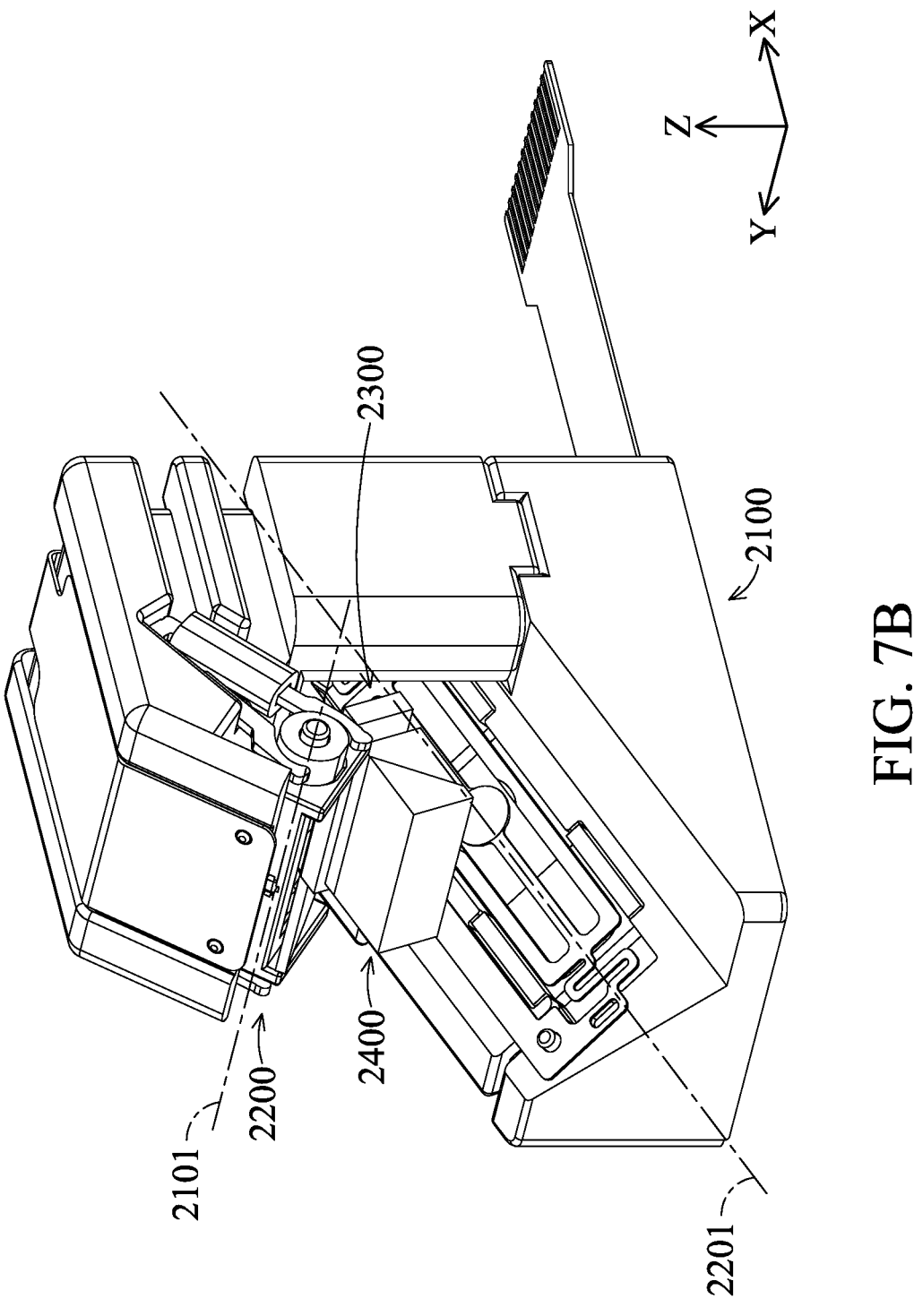
FIG. 7B and FIG. 7C are schematic views of the optical system when the case is omitted.
Figure 7C:
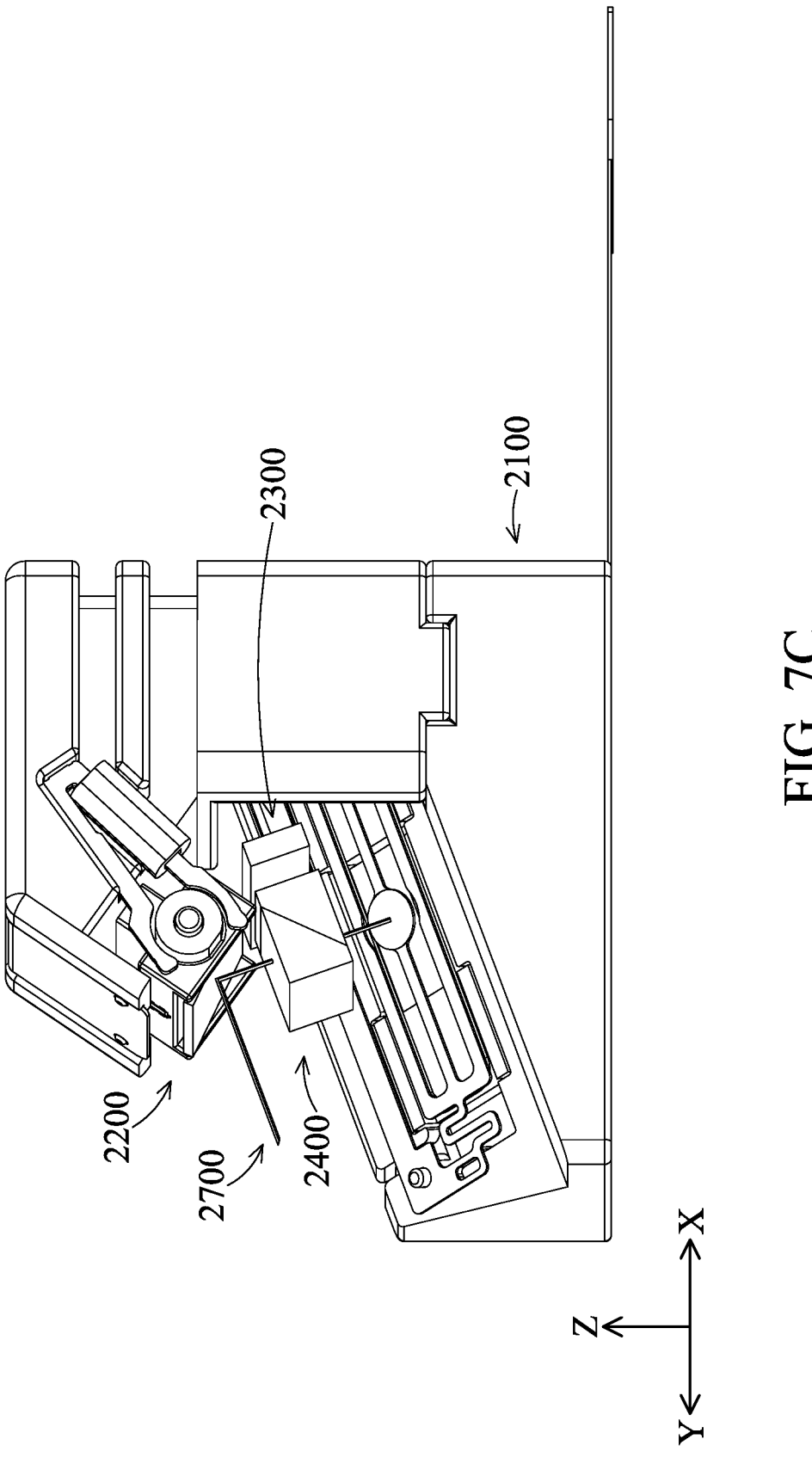
Figure 7D:
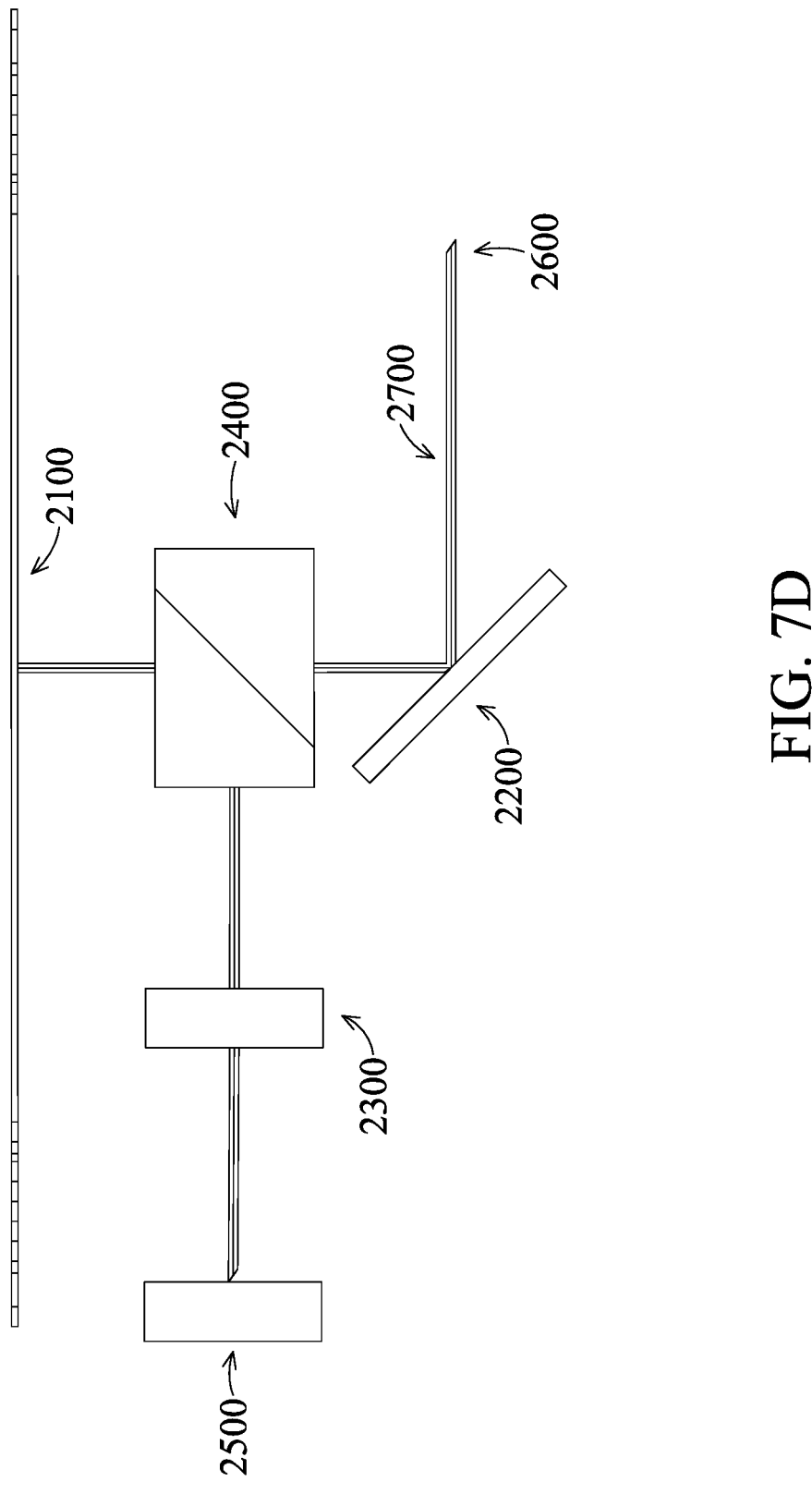
FIG. 7D is a schematic view showing position relationship between elements of the optical system.

FIG. 7A is a schematic view of an optical system 2000 in to some embodiments of the present invention, which mainly includes a case 2001 and other elements disposed in the case 2001. FIG. 7B and FIG. 7C are schematic views of the optical system 2000 viewed from different directions without the case 2001. FIG. 7D is a schematic view of the positional relationship of some elements of the optical system 2000. As shown in FIG. 7A to FIG. 7D, the optical system 2000 mainly includes a first optical module 2100, a second optical module 2200, a third optical module 2300, a fourth optical module 2400, and a light source 2500.

In some embodiments, the second optical module 2200 may be disposed on the first optical module 2100. The first optical module 2100 may be used to drive an optical element to rotate relative to the first axis 2101, and the second optical module 2200 may be used to drive another optical element to rotate relative to the second axis 2201, so as to change the path of the light 2700 incident to the first optical module 2100 and the second optical module 2200. In some embodiments, the first axis 2101 and the second axis 2201 are not parallel to each other, for example, they may be perpendicular to each other. In some embodiments, the centers of the first optical module 2100, the second optical module 2200, and the light source 2500 may be disposed on a same plane, and the first axis 2101 may be parallel to this plane, and the second axis 2201 may be perpendicular to this plane.

After the light 2700 is emitted from the light source 2500, it will pass through the third optical module 2300 and the fourth optical module 2400 in sequence. In some embodiments, the third optical module 2300 may be used to adjust the light 2700, for example, its wavelength, focal length, beam size and other properties may be adjusted. For example, the third optical module 2300 may include elements such as lenses and filter elements.

In some embodiments, the fourth optical module 2400 may include a structure that may split light, such as a beam splitter, so that the light 2700 incident from the third optical module 2300 to the fourth optical module 2400 may be divided into two rays of light. One of the lights may enter the first optical module 2100, and then change direction through the first optical module 2100, and then enter the fourth optical module 2400 again, and then reach the second optical module 2200. At the same time, another light 2700 split by the fourth optical module 2400 directly reaches the second optical module 2200, and then combines with the aforementioned light 2700 emitted from the first optical module 2100, and then leaves the optical system 2000 through the light exit position 2600.

Figure 8:
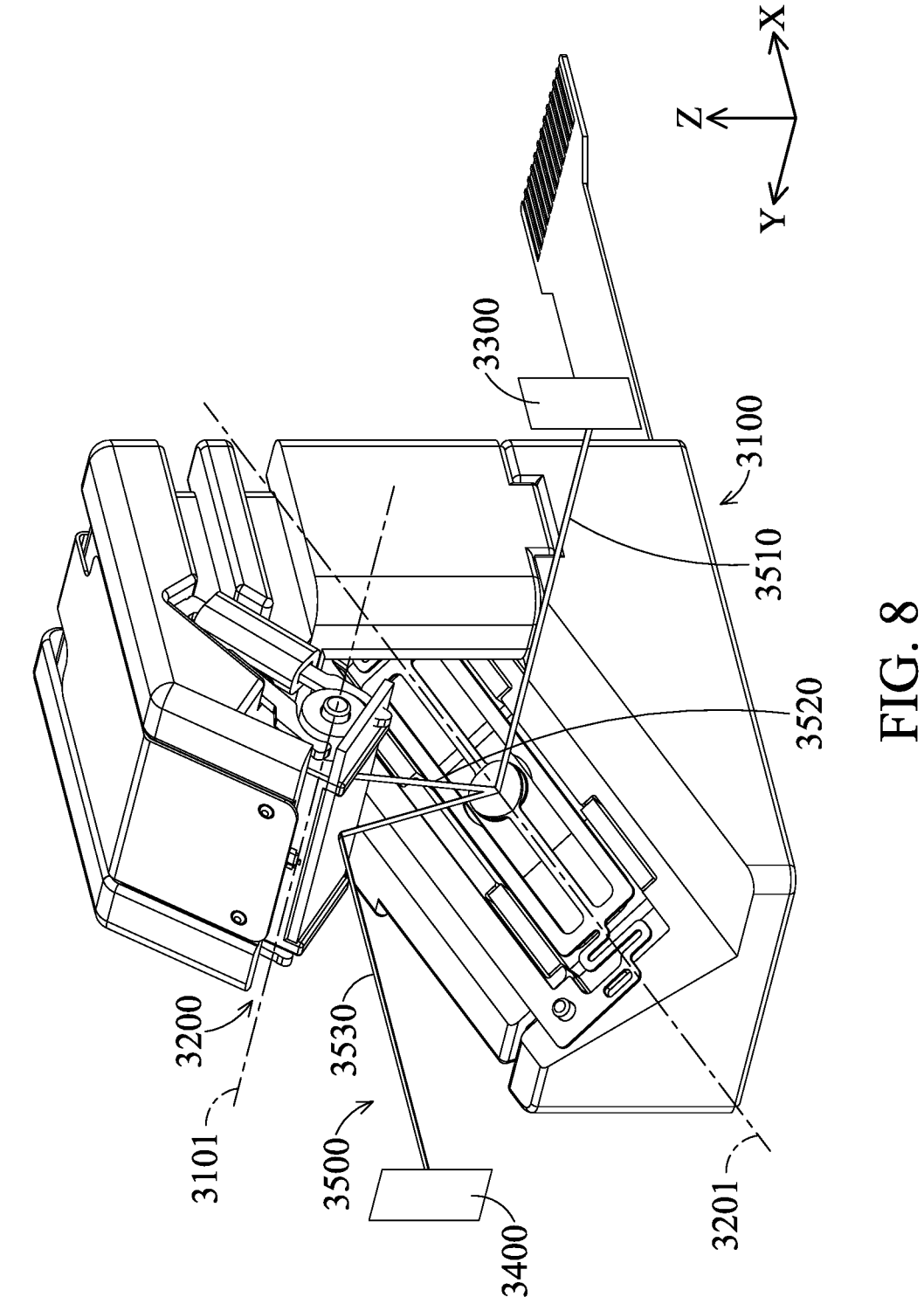
FIG. 8 is a schematic view of an optical system in some embodiments of the present disclosure.

FIG. 8 is a schematic view of an optical system 3000 according to some embodiments of the present disclosure. The optical system 3000 may have a first optical module 3100, a second optical module 3200, and a light source 3300. In some embodiments, the second optical module 3200 may be disposed on the first optical module 3100. The first optical module 3100 may be used to drive an optical element to rotate relative to the first axis 3101, and the second optical module 3200 may be used to drive another optical element to rotate relative to the second axis 3201, so as to change the path of the light 3500 incident to the first optical module 3100 and the second optical module 3200. In some embodiments, the first axis 3101 and the second axis 3201 are not parallel to each other, for example, they may be perpendicular to each other. In some embodiments, the first axis 3101 may be perpendicular to a plane, centers of the first optical module 3100 and the second optical module 3200 may be disposed on the plane, and the light source 3300 may be separated from the plane.

In some embodiments, the light 3500 may be incident on the first optical module 3100 along a first path 3510, and then the first optical module 3100 may change the path of the light 3500 to a second path 3520 and then leaves the first optical module 3100. In some embodiments, the first path 3510 may be parallel to the first axis 3101. In some embodiments, an angle between the first path 3510 and the second path 3520 may not be 90 degrees, for example, it may be between 45 degrees and 90 degrees.

Next, the light 3500 may reach the second optical module 3200 along the second path 3520, and then the second optical module 3200 may change the path of the light 3500 to a third path 3530 and emits the light 3500 from the second optical module 3200. Afterwards, the light 3500 leaves the optical system 3000 from the light exit position 3400. In some embodiments, an angle between the second path 3520 and the third path 3530 may not be 90 degrees, for example, may be between 90 degrees and 135 degrees. In this way, the path of the light 3500 may be changed, and the point light may be transformed into a planar light, so that functions such as detection, scanning, and projection may be achieved.

In summary, an optical system is provided, including a first optical module and a second optical module. The first optical module is used for changing the direction of light emitted from a light source. The second optical module corresponds to the first optical module and is used for changing the direction of the light. The direction of the light exit the first optical module is different from the direction of the light exit the second optical module. Therefore, functions like detection, scanning, and projection may be achieved, and miniaturization may be achieved as well.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical system, comprising:
a first optical module used for changing the direction of light emitted from a light source;
a second optical module corresponding to the first optical module and used for changing the direction of the light, wherein the direction of the light exit the first optical module is different from the direction of the light exit the second optical module, and the second optical module is disposed immediately downstream of the first optical module, wherein the second optical module comprises:
a fixed portion;
a movable portion being movable relative to the fixed portion;
a driving assembly, comprising:
a first driving portion disposed on one side of the fixed portion and the movable portion, and comprises a first magnetic element; and
a second driving portion disposed on another side of the fixed portion and the movable portion, and comprises a second magnetic element; and
a support assembly, comprising an intermediate element passing through the first magnetic element and the second magnetic element;
a third optical module used for adjusting the light; and
a fourth optical module used for changing the direction of the light,
wherein the light passes through each of the third optical module, the fourth optical module, the first optical module, and the second optical module exactly once in sequence, and then exits from the optical system.

2. The optical system as claimed in claim 1, wherein a center of the light source, a center of the first optical module, and a center of the second optical module are in an identical plane.

3. The optical system as claimed in claim 2, wherein:
the first optical module comprises a first optical element rotatable relative to a first axis;
the second optical module further comprises a second optical element rotatable relative to a second axis, wherein the intermediate element extends along the second axis;
the first axis and the second axis are not parallel.

4. The optical system as claimed in claim 3, wherein one of the first axis and the second axis is perpendicular to the plane.

5. The optical system as claimed in claim 4, wherein another one of the first axis and the second axis is parallel to the plane.

6. The optical system as claimed in claim 5, wherein:
the light passes through the first optical module and the second optical module in sequence, and the first axis is parallel to the plane;
the first axis and the second axis are perpendicular;
the third optical module is in the plane.

7. The optical system as claimed in claim 6, wherein:
the fourth optical module is in the plane.

8. The optical system as claimed in claim 1, wherein:
the light passes to the first optical module through a first path, and exits the first optical module through a second path;
an angle between the first path and the second path is not 90 degrees.

9. The optical system as claimed in claim 8, wherein the angle between the first path and the second path is less than 90 degrees.

10. The optical system as claimed in claim 9, wherein the angle between the first path and the second path is greater than 45 degrees.

11. The optical system as claimed in claim 10, wherein:
the light reaches the second optical module after exiting from the first optical module, and then exits the second optical module along a third path;
an angle between the second path and the third path is not 90 degrees.

12. The optical system as claimed in claim 11, wherein the angle between the second path and the third path is less than 135 degrees.

13. The optical system as claimed in claim 12, wherein the angle between the second path and the third path is greater than 90 degrees.

14. The optical system as claimed in claim 1, wherein the support assembly further comprises:
a first connecting element disposed on the fixed portion and having a first opening;
a second connecting element disposed on the fixed portion and having a second opening, wherein the intermediate element passes through the first opening and the second opening.

15. The optical system as claimed in claim 14, wherein the first connecting element and the second connecting element are disposed between the first driving portion and the second driving portion.

16. The optical system as claimed in claim 1, wherein the first driving portion further comprises:
a first magnetic permeable element comprising a first portion and a second portion connected to the first portion, wherein the first portion extends in a first direction; and
a first coil disposed on the first magnetic permeable element, wherein the first coil surrounds the first portion, and the second portion is arc-shaped;
wherein the first magnetic element and the second portion are arranged in a second direction, and the first direction and the second direction are different.

17. The optical system as claimed in claim 16, wherein the fixed portion comprises a first accommodating portion and a second accommodating portion, the first coil is disposed in the first accommodating portion, the first magnetic permeable element is disposed in the second accommodating portion, and a depth of the second accommodating portion is less than a depth of the first accommodating portion.

* * * * *